No. 681,584. Patented Aug. 27, 1901.
O. SCHÖNAUER.
APPARATUS FOR AUTOMATICALLY RETURNING WORK TABLES OF MILLING MACHINES.
(Application filed Mar. 30, 1901.)
(No Model.)
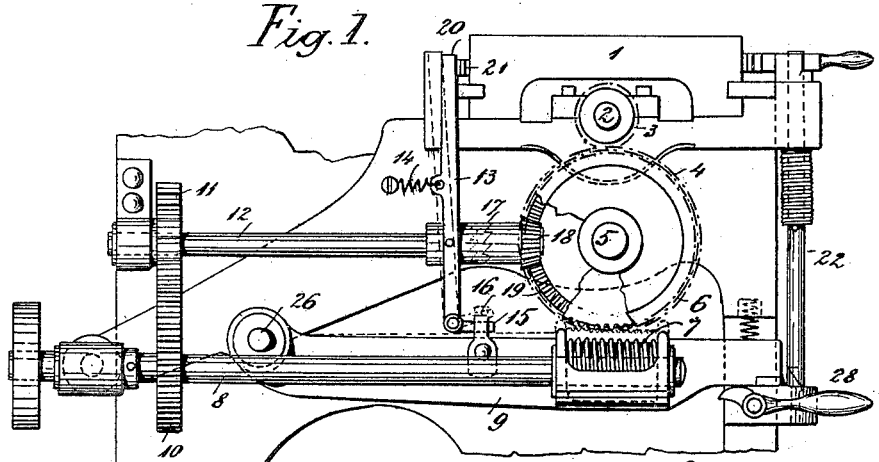
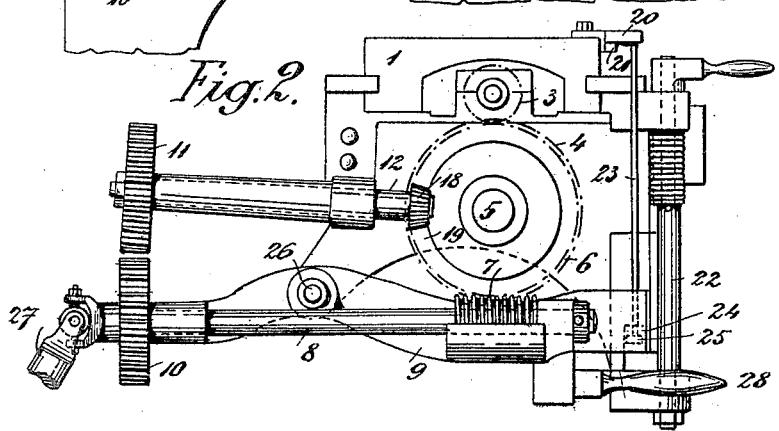
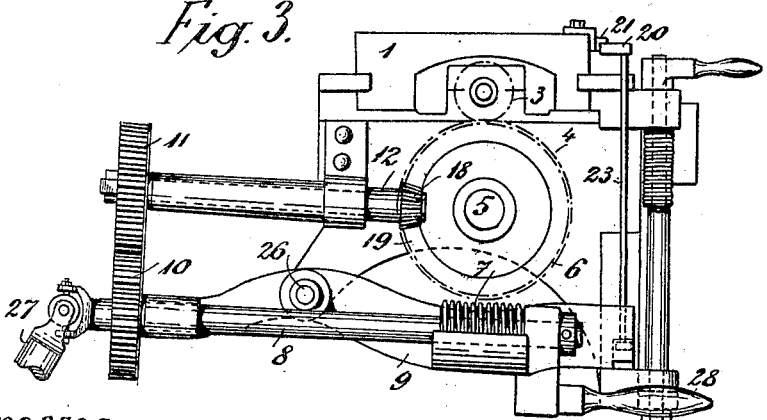
Witnesses:
Fred Englert
Percy C. Bowen
Inventor:
Otto Schönauer
by Wilkinson & Fisher
Attorneys

UNITED STATES PATENT OFFICE.

OTTO SCHÖNAUER, OF STEYR, AUSTRIA-HUNGARY.

APPARATUS FOR AUTOMATICALLY RETURNING WORK-TABLES OF MILLING-MACHINES.

SPECIFICATION forming part of Letters Patent No. 681,584, dated August 27, 1901.

Application filed March 30, 1901. Serial No. 53,708. (No model.)

*To all whom it may concern:*

Be it known that I, OTTO SCHÖNAUER, managing director, a subject of the Emperor of Austria-Hungary, residing at Steyr, in the Province of Upper Austria and Empire of Austria-Hungary, have invented certain new and useful Improvements in Apparatus for Automatically Returning the Work-Tables of Milling-Machines; and I do hereby declare the following to be a full, clear, and exact description of the invention, such as will enable others skilled in the art to which it appertains to make and use the same.

The present invention relates to a device for effecting the speedy and automatic return of the work-tables of milling-machines. Hitherto the operative has had to move back the table by hand when the cut has been made, which without taking into account the physical strain on the operative wasted time. By means of the present invention the operative is relieved from this labor and is thereby enabled to give his full attention to two or even more machines.

In the accompanying drawings, Figure 1 is an end view of a construction according to this invention. Figs. 2 and 3 are end views of a modification of the construction in different positions.

The table 1 receives motion through a screw 2, which is driven by means of the gear-wheel 3 and a second gear-wheel 4 on the shaft 5. The shaft 5 on its part is driven during the cutting by a worm-wheel 6, keyed upon it, and worm 7, keyed on the shaft 8. This shaft 8 is journaled in a lever 9, pivoted at 26 in the frame, which lever can be raised by hand and be lowered by turning a spindle 22 in order to place the worm 7 in or out of gear with the wheel 6. The shaft 8 can be driven by a shaft 27 by means of a universal link, Figs. 2 and 3, or by belt-pulleys, gear-wheels, or by friction devices, Fig. 1. When the piece of work has been put into the drawn-out table, the worm is coupled with the wheel 6 by hand and the table 1 moves forward. When the cut has been made, the worm 7 is brought out of engagement with the wheel 6 by means of the spindle 22. Up to this point the arrangement described is already known. Hitherto the operative as soon as 7 and 6 were brought out of engagement moved back the table by hand in order to be able to put in a new piece of work and to operate on the same. According to the present invention, however, the table travels back automatically at the same time as the worm 7 is thrown out of gear, and, moreover, when it has been returned to the necessary position for putting in the work it comes to a standstill automatically. Furthermore, the table travels back much more quickly than it moves forward. This is effected in that the release of the worm-wheel operates a connection whereby the force driving the shaft 8 is caused to transmit motion to the shaft 5 by means of the shaft 12, Fig. 1, whereby the rotation of the shaft 5 is quicker than when it is caused to rotate by the worm 7, and vice versa, or else by shaft 8, which is driven direct, being coupled with the shaft 12, which remains coupled with the shaft 5, Figs. 2 and 3. The shafts 8 and 12 are, however, uncoupled again by the table returning into the position for putting in the work, but without bringing 7 again into engagement with 6, so that then the screw 2, and consequently also the table, are stationary and the work can be put in. Then by first raising the lever 9 by means of the handle 28 the worm 7 engages with the worm-wheel 6 again and the table commences its operative motion. The attendant, therefore, has only to operate the lever 9 before the forward movement of the table after the work is put in. The table, however, travels back and becomes stationary at the end of its backward motion automatically.

The mechanisms for making the aforesaid coupling differ according to the construction of the machine and can be varied in manifold ways. In the constructional form illustrated in Fig. 1 the shaft 8, operated by pulleys, is always coupled with the shaft 12 by means of the wheels 10 and 11. The bevel-wheel 18 on the latter shaft engages in the bevel-wheel 19, fixed on the shaft 5. The wheel 18, which can move along the shaft 12, engages from time to time with the coupling 17, connected therewith in an angle-lever 13, the shorter arm 15 of which is inclosed by a projection 16 of the lever 9. The position of the parts is so arranged that when the lever 9, bearing the worm-shaft 8, is raised, and the worm 7 is consequently in engagement with the wheel 6, the lever 13 is turned outward, and therefore the clutch-coupling box 17 is disengaged, as is shown in dotted lines in Fig. 1. The table then effects, as shown, its operative motion. After it is finished the spindle 22 is moved so that the lever 9 goes downward, so that 7 and 6 come out of engagement. The projection 16 on the lever 9 comes thereby onto the arm 15 of the angle-lever 13, which throws the clutch-coupling box 17 into gear, and the shaft 5 is turned backward by the shaft 12 by aid of the bevel-gearing 18 and 19 much quicker than it was turned forward, as shown in full lines in Fig. 1. When the table 1 has completely traveled back, a wedge 21, fixed thereon, pushes against the continuation 20 of the upper part of the lever 13, and thereby pushes the latter, and consequently the coupling-box 17, into the position shown by dotted lines, where the coupling-box 17 is released. The spring 14 keeps it firm in this position. At the same time the lever 9 is raised by the other end 15 of the lever 13, but not far enough for the worm 7 to come into engagement. The shaft 5 is consequently neither turned by the shaft 12 nor by the worm-wheel 7—that is to say, this shaft, together with the table, is stationary, thereby allowing the material upon the table to be changed in position or removed to allow new material to be substituted. In the constructional form shown in Figs. 2 and 3, in which the shaft 8 is driven by the shaft 27 through the medium of a universal link, the shaft 12, on the other hand, can be driven by the shaft 8 by means of the spur-wheels 10 and 11 and the wheel 18 is firmly keyed on the shaft 12, the wheel 10 is brought out of engagement with the wheel 11 when the lever 9 is raised by hand in order to bring the worm 7 in gear with the worm-wheel 6, the shaft 12 is accordingly disengaged from the shaft 8, and the shaft 5 is turned by the worm 7 in order to move the table forward, Fig. 2. When the cut is finished, the lever 9 will be let down by operating the spindle 22, 7 and 6 come out of engagement, Fig. 3; but, on the other hand, the wheel 10 comes into gear with the wheel 11 and the shaft 5 is quickly turned backward by the wheels 19 and 18. When the table has completely traveled back in this manner, the wedge 21, fixed thereto, comes under a projection 20 of a bar 23, which on its lower end bears a head 24, which moves in a hollow 25 of the lever 9 and lifts the bar and thereby the lever until the wheels 10 and 11 come out of gear; but the worm 7 has still not come into engagement with the wheel 6. The shaft 5 is consequently not moved and the table stands still in order that a fresh piece of work can be put in. When this has been done, the lever 9 is raised by hand, which movement is in no wise prevented by the bar 23, and the table travels forward.

I claim—

1. In a milling-machine, the combination with the traveling table, and gearing connected thereto; of a swinging shaft mounted beneath said table, gearing upon one end of said swinging shaft adapted to engage said gearing, a second shaft, a clutch carrying a gear adapted to be thrown into operation with said table-gearing, carried upon one end of said shaft, gears upon the opposite ends of both said shafts connecting the same together, a bell-crank lever connected to said clutch and swinging shaft, adapted to be operated by said table to automatically throw said swinging shaft out of operation and said second shaft into operation, and means for restoring said swinging shaft to its initial position, substantially as described.

2. In a milling-machine, the combination with a traveling table, and gearing connected thereto; of a swinging shaft mounted beneath said table, a swinging arm supporting said shaft, a worm-wheel mounted upon one end of said shaft, adapted to engage said gearing, a second shaft, gearing connecting said shafts, a clutch mounted upon said second shaft, a bevel-gear carried by said clutch, adapted to mesh with said gearing, a bell-crank lever, connected at its lower end to said swinging arm, and its opposite end free to be operated, connection between said bell-crank lever and said clutch, and devices carried by said table for operating said bell-crank lever, substantially as described.

In testimony whereof I affix my signature in presence of two witnesses.

OTTO SCHÖNAUER.

Witnesses:
C. B. HURST,
ALVESTO S. HOGUE.